US009382718B1

(12) United States Patent
Li

(10) Patent No.: US 9,382,718 B1
(45) Date of Patent: Jul. 5, 2016

(54) ENGINEERED WOOD FLOORING WITH A DOUBLE-FRAME SUBSTRATE

(71) Applicant: SHENZHENSHI HUANWEI WOODS CO., LTD, Shenzhen (CN)

(72) Inventor: David Li, Guangdong (CN)

(73) Assignee: SHENZHENSHI HUANWEI WOODS CO., LTD., Shenzhen (CN)

( * ) Notice: Subject to any disclaimer, the term of this patent is extended or adjusted under 35 U.S.C. 154(b) by 0 days.

(21) Appl. No.: 14/813,859

(22) Filed: Jul. 30, 2015

(30) Foreign Application Priority Data

Jun. 25, 2015 (CN) .......................... 2015 2 0442138

(51) Int. Cl.

| | |
|---|---|
| ***B44F 7/00*** | (2006.01) |
| ***B44F 9/00*** | (2006.01) |
| ***E04C 1/00*** | (2006.01) |
| ***E04F 15/04*** | (2006.01) |
| ***E04F 15/02*** | (2006.01) |
| ***B32B 21/13*** | (2006.01) |
| ***B32B 3/14*** | (2006.01) |
| ***B32B 21/02*** | (2006.01) |

(Continued)

(52) U.S. Cl.

CPC . *E04F 15/04* (2013.01); *B32B 3/06* (2013.01); *B32B 3/14* (2013.01); *B32B 21/02* (2013.01); *B32B 21/13* (2013.01); *E04F 15/02038* (2013.01); *B32B 23/044* (2013.01); *B32B 2419/04* (2013.01); *E04C 2/12* (2013.01); *E04C 2/24* (2013.01); *E04F 15/02* (2013.01); *E04F 15/02161* (2013.01); *E04F 15/107* (2013.01); *E04F 2201/0107* (2013.01); *E04F 2201/023* (2013.01); *E04F 2203/00* (2013.01); *Y10T 428/18* (2015.01); *Y10T 428/24066* (2015.01); *Y10T 428/24132* (2015.01); *Y10T 428/31989* (2015.04)

(58) Field of Classification Search

CPC ............ E04C 2/12; E04C 2/24; E04F 15/107; E04F 15/02161; E04F 2201/023; E04F 15/02; B32B 21/13; B32B 23/044; Y10T 428/24066; Y10T 428/18; Y10T 428/24132; Y10T 428/31989

USPC .................. 52/391, 392, 311.2, 590.2, 589.1, 52/591.1, 591.5, 592.1, 592.2, 313; 428/54, 58, 106, 537.1, 393, 114

See application file for complete search history.

(56) References Cited

U.S. PATENT DOCUMENTS 2,139,880 A * 12/1938 Colucci ..................... E04C 2/12 428/106
3,969,558 A * 7/1976 Sadashige ................. B27L 5/00 144/346

(Continued)

*Primary Examiner* — Chi Q Nguyen
(74) *Attorney, Agent, or Firm* — Shimokaji IP

(57) ABSTRACT

The present invention relates to engineered wood flooring with a double-frame substrate. The engineered wood flooring comprises a double-frame substrate of wood and a solid wood panel adhered to the double-frame substrate. The double-frame substrate of wood comprises a horizontal grain core and two vertical grain frames; two vertical grain frames are bonded on both sides of the horizontal grain core along the grain direction of the core; the horizontal grain core is sandwiched in the middle, and the horizontal grain core and the vertical grain frame are perpendicular to each other and located in the same plane; the vertical grain frame on each side comprises two vertical grain boards, and one vertical wood board is located between the horizontal grain core and the other vertical wood board. The engineered wood flooring has excellent resistance of deformation, small deformation, high strength and steady usage.

19 Claims, 1 Drawing Sheet

(51) Int. Cl.
*B32B 3/06* (2006.01)
*E04C 2/12* (2006.01)
*B32B 23/04* (2006.01)
*E04F 15/10* (2006.01)
*E04C 2/24* (2006.01)

(56) References Cited

U.S. PATENT DOCUMENTS 4,503,648 A * 3/1985 Mahaffey ................ E04B 2/709 52/223.7
5,050,653 A * 9/1991 Brown ................... B27M 3/006 144/347
5,881,786 A * 3/1999 Wilderman ............. B27B 1/007 144/3.1
5,888,620 A * 3/1999 Grenier ..................... B07C 5/14 144/332
5,944,928 A * 8/1999 Seidner ................ B27M 3/0053 144/346
6,025,053 A * 2/2000 Grenier ..................... B07C 5/14 144/332
6,182,413 B1 * 2/2001 Magnusson ............. B32B 3/266 52/309.8
6,860,071 B2 * 3/2005 Weaber .................... B27M 3/04 428/172
9,103,113 B2 * 8/2015 Lockhart ............... E04B 2/7412
2003/0012970 A1 * 1/2003 Auclair ................... B32B 21/13 428/537.1
2007/0130866 A1 * 6/2007 Lott ........................ E04C 2/246 52/481.1

* cited by examiner

ENGINEERED WOOD FLOORING WITH A DOUBLE-FRAME SUBSTRATE

PRIORITY INFORMATION

The present application claims priority to Chinese Application No. 201520442138.7, entitled Engineered Wood Flooring with a Double-Frame Substrate, filed on 25 Jun. 2015, the entire contents of which are hereby incorporated by reference.

FIELD OF THE INVENTION

The present invention relates to the field of the structural design of engineered wood flooring, particularly to engineered wood flooring with a double-frame substrate.

BACKGROUND OF THE INVENTION

With the continuous improvement of people's quality of life, solid wood floorings become more and more popular. Existing solid wood floorings can generally be classified into pure solid wood floorings made by log processing and engineered wood flooring. Pure solid wood floorings completely retain the original state of natural lumber and have a true and beautiful texture, and high degree of environmental protection. They also have many advantages, such as fine appearance, high grade, natural and environmental friendly, etc. However, pure solid wood floorings have a large deformation rate and they will swell or shrink and easily warp under changes in air temperature or humidity, leading to bad use effect.

Engineered wood floorings are made by layered process so that each timber mutually restrains each other and a certain degree of internal stress can be offset. The deformation rate of engineered wood floorings is lower than that of pure solid wood floorings, such as the laminate floorings with two layers staggering disclosed in patent CN2438558Y. However, due to the difference in materials' density and moisture content of surface layer and substrate, layered deformation and warp occur easily for engineered wood floorings under the effect of environmental temperature or humidity, etc. Patent CN202062479U discloses a doorframe-type solid wood plank. It has the doorframe-type bounded structure formed by setting a liner in the frame, improving the anti-bending deformation performance of the solid wood plank to prevent the bump and contracting inward.

SUMMARY OF THE INVENTION

The most important indicators to measure the performance of engineered wood floorings are anti-bending deformation, resistance to contraction and expansion, and high use efficiency, which are also the important research direction of engineered wood floorings. Although the said doorframe-type solid wood plank helps extend the usable life of engineered wood floorings, warping deformation still occurs for engineered wood floorings and engineered wood floorings easily swell or shrink under the influence of environment, which will influence service life.

Based on the existing problems in the art, the present invention provides an engineered wood flooring with a double-frame substrate to further solve the problems of easy bending deformation and warp of engineered wood floorings.

The engineered wood flooring with a double-frame substrate, comprising:

a double-frame substrate of wood comprising a horizontal grain core and two vertical grain frames; wherein two vertical grain frames are bonded on both sides of the horizontal grain core along the grain direction of the core; the horizontal grain core is sandwiched in the middle, and the horizontal grain core and the vertical grain frame are perpendicular to each other and located in the same plane; the vertical grain frame on each side comprises two vertical grain boards, and one vertical wood board is located between the horizontal grain core and the other vertical wood board; and a solid wood panel adhered to the double-frame substrate. Obviously, the width of vertical grain frame on each side may be equal or not equal, and the width of every vertical wood board formed the vertical grain frame on each side may be equal or not equal.

Width of vertical grain frame is represented by d1 and width of the vertical wood board is represented by d2. It can be obviously seen from FIG. 1 that the width of vertical grain frame d1 is the side length of vertical grain frame along the horizontal grain direction. The width of the vertical wood board d2 is the side length of vertical wood board along the horizontal grain direction.

Optionally, a width of the vertical grain frame on each side d1, including two endpoints, is both in a range of 1 to 4 cm.

Optionally, a width of the vertical wood board d2, including two endpoints, is in a range of 0.5 to 2 cm.

Optionally, the horizontal grain core consists of a plurality of strip-type horizontal grain boards glued together, and a width of each strip-type horizontal grain board d3, including two endpoints, is both in a range of 1 to 4 cm.

It can be obviously seen from FIG. 1 that a width of each strip-type horizontal grain board d3 is the side length of horizontal grain board along the vertical grain direction.

Optionally, a thickness of the engineered wood flooring is in a range of 0.5 to 3 cm. As shown in FIG. 1 and FIG. 2, the thickness of the vertical grain frame 12, the vertical grain board 121, the horizontal grain core 11 and strip-type horizontal grain board 111 are all equal to the thickness of the double-frame substrate of wood 1, h. That is to say, thickness h is not only the thickness of the double-frame substrate, but also is the thickness of the vertical grain frame 12, the vertical grain board 121, the horizontal grain core 11 and strip-type horizontal grain board 111, respectively. The thickness of the engineered wood flooring is equal to the total thickness of the double-frame substrate of wood 1 and the panel.

Optionally, the horizontal grain core 11 and the vertical grain frames 12 are assembled together to form the double-frame substrate of wood 1 by means of binding without saw-tooth, micro teeth tenon riveting structure, bolted structure, finger jointed structure or tongued-and-grooved joint.

Optionally, the two vertical grain boards 121 are assembled together to form the vertical grain frames 12 by means of binding without saw-tooth, micro teeth tenon riveting structure, bolted structure, finger jointed structure or tongued-and-grooved joint.

Optionally, the tongued-and-grooved joint is set around all the outer periphery of the engineered wood flooring and the tongued-and-grooved joint can be fixed with the tongued-and-grooved joint of another engineered wood flooring with a double-frame substrate.

The stresses of the engineered wood flooring of the present invention, formed under processing stress and changes in environmental temperature and humidity, can be all effectively released. Furthermore, the performance of resistance to contraction or expansion is greatly improved, which makes the engineered wood flooring have more excellent resistance to easy bending deformation and warp.

BRIEF DESCRIPTION OF THE DRAWINGS

In order to illustrate the embodiments of present invention or the technical solutions of prior art more clearly, the drawings in embodiments or the drawings needed in the description of prior art will be introduced briefly. Apparently, hereinafter described drawings are merely a portion of embodiments of present invention. For those skilled in the art, they can obtain other drawings on the base of these drawings without creative work.

DETAILED DESCRIPTION OF ILLUSTRATED EMBODIMENTS

In order to make those skilled in the art understand the technical solution of present invention better, clear and complete description of the technical solution of present invention will be illustrated, which combined with the drawings of present invention embodiments. Apparently, described embodiments are merely a portion of embodiments of present invention, rather than all of the embodiments. Base on the embodiments of present invention, all other embodiments obtained by those skilled in the art without creative work are considered to be encompassed within the scope of the present invention. Following number range all includes two endpoints.

Figure 1:
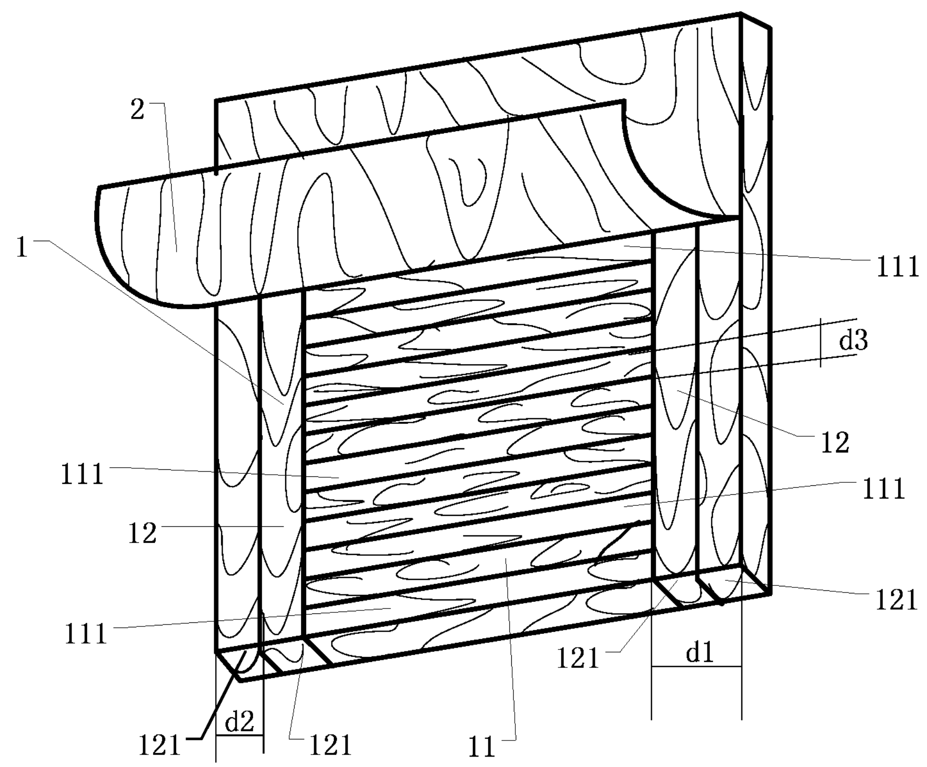
FIG. 1 is a sectional view of engineered wood flooring with a double-frame substrate of present invention.

Board are cut, dried, and processed into strip-type horizontal grain board 111 which having a certain length and a width d3 in a range of 1 to 4 cm. A plurality of strip-type horizontal grain boards 111 are glued together to form the horizontal grain core 11. As shown in FIG. 1, the vertical grain frames 12 are bonded on both sides of the horizontal grain core 11 along the grain direction of the core. The horizontal grain core 11 is sandwiched in the middle of the vertical grain frames 12, and the vertical grain frame and the horizontal grain core are perpendicular to each other and located in the same plane; the vertical grain frame on each side comprises two vertical grain boards 121, and one vertical wood board is located between the horizontal grain core and the other vertical wood board. So the horizontal grain core 11 is combined with the vertical grain frames 12 as an integration, formed the double-frame substrate of wood 1.

Herein, width of vertical grain frame 12 on each side may be equal or not equal, and the width of vertical grain frame d1 is in a range of 1 to 4 cm. Width of each vertical wood board 121 formed the vertical grain frame on each side may be equal or not equal, and width of said each vertical wood board d2 is in a range of 0.5 to 2 cm. Such as, width of one side vertical grain frame is 2 cm, and width of another side vertical grain frame is 4 cm, and the width of each vertical grain board correspondingly formed the vertical grain frames is 1 cm, 1 cm, 2 cm and 2 cm, respectively; or such as, width of one side vertical grain frame is 2 cm, and width of another side vertical grain frame is also 2 cm, and the width of each vertical grain board correspondingly formed the vertical grain frames is 1 cm, 1 cm, 0.5 cm and 1.5 cm, respectively; or such as, width of one side vertical grain frame is 2 cm, and width of another side vertical grain frame is also 2 cm, and the width of each vertical grain board correspondingly formed the vertical grain frames is 1 cm, 1 cm, 1 cm and 1 cm, respectively, etc.

Then, solid wood panel 2 is glued to double-frame substrate of wood 1, and said solid wood panel 2 is completely covered on the horizontal grain core and vertical grain frame, and laminated to form engineered wood flooring with a double-frame substrate. Thickness of the engineered wood flooring is in a range of 0.5 to 3 cm. The tongued-and-grooved joint is set around all the outer periphery of the engineered wood flooring and the tongued-and-grooved joint can be fixed with the tongued-and-grooved joint of another engineered wood flooring with a double-frame substrate.

Figure 2:
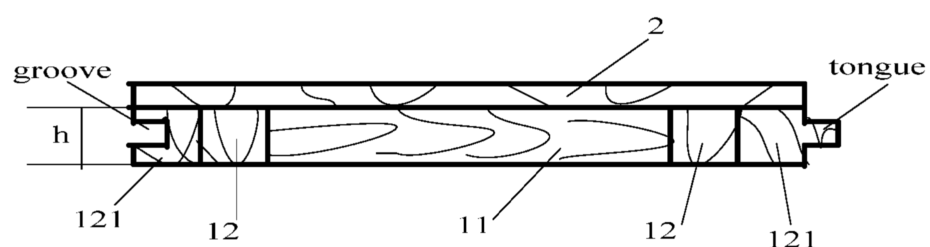
FIG. 2 is a lateral view of engineered wood flooring with a double-frame substrate of present invention.

As shown in FIG. 1 and FIG. 2, width d1 of vertical grain frame 12 is the side length of vertical grain frame along the horizontal grain direction, and the width d2 of vertical wood board 121 is the side length of vertical grain board along the horizontal grain direction; width d3 of strip-type horizontal grain boards 111 formed horizontal grain core is the side length of strip-type horizontal grain boards along the vertical grain direction. The thickness of vertical grain frame 12, vertical wood board 121, horizontal grain core 11, and strip-type horizontal grain boards 111 are all equal to the thickness of double-frame substrate of wood 1, h. The thickness of engineered wood flooring is equal to the total thickness of the double-frame substrate of wood 1 and the panel.

As stated above, the above embodiments are merely to illustrate the technical solution of present invention, but not intended to limit. While the present invention has been illustrated with reference to above embodiments, those skilled in the art should understand that modifications of technical solution of above embodiments or equivalent substitutions of some technical features can also be made. These modifications or equivalent substitutions cannot make the separation of essence of corresponding technical solutions from the scope of various embodiments' technical solution of the present invention.

What is claimed is:

1. An engineered wood flooring with a double-frame substrate, comprising:

a double-frame substrate of wood comprising a horizontal grain core and two vertical grain frames; wherein two vertical grain frames are bonded on both sides of the horizontal grain core along the grain direction of the core; the horizontal grain core is sandwiched in the middle, and the horizontal grain core and the vertical grain frames are perpendicular to each other and located in the same plane; each of the vertical grain frames comprises two vertical grain boards disposed in parallel along the grain direction of the core, and one vertical wood board is located between the horizontal grain core and the other vertical wood board; the horizontal grain core consists of a plurality of strip-type horizontal grain boards glued in parallel along the grain direction of the vertical grain frame; and a solid wood panel adhered to the double-frame substrate.

2. The engineered wood flooring with a double-frame substrate as claimed in claim 1, wherein a width of the vertical grain frame on each side is both in a range of 1 to 4 cm.

3. The engineered wood flooring with a double-frame substrate as claimed in claim 2, wherein a width of each strip-type horizontal grain board is both in a range of 1 to 4 cm.

4. The engineered wood flooring with a double-frame substrate as claimed in claim 2, wherein a thickness of the engineered wood flooring is in a range of 0.5 to 3 cm.

5. The engineered wood flooring with a double-frame substrate as claimed in claim 2, wherein the horizontal grain core and the vertical grain frames are assembled together to form the double-frame substrate of wood by means of binding without saw-tooth, micro teeth tenon riveting structure, bolted structure, finger jointed structure or tongued-and-grooved joint.

6. The engineered wood flooring with a double-frame substrate as claimed in claim 2, wherein the two vertical grain boards are assembled together to form the vertical grain frame by means of binding without saw-tooth, micro teeth tenon riveting structure, bolted structure, finger jointed structure or tongued-and-grooved joint.

7. The engineered wood flooring with a double-frame substrate as claimed in claim 2, wherein the tongued-and-grooved joint is set around all the outer periphery of the engineered wood flooring and the tongued-and-grooved joint can be fixed with the tongued-and-grooved joint of another engineered wood flooring with a double-frame substrate.

8. The engineered wood flooring with a double-frame substrate as claimed in claim 1, wherein a width of the vertical wood board is both in a range of 0.5 to 2 cm.

9. The engineered wood flooring with a double-frame substrate as claimed in claim 8, wherein a width of each strip-type horizontal grain board is both in a range of 1 to 4 cm.

10. The engineered wood flooring with a double-frame substrate as claimed in claim 8, wherein a thickness of the engineered wood flooring is in a range of 0.5 to 3 cm.

11. The engineered wood flooring with a double-frame substrate as claimed in claim 8, wherein the horizontal grain core and the vertical grain frames are assembled together to form the double-frame substrate of wood by means of binding without saw-tooth, micro teeth tenon riveting structure, bolted structure, finger jointed structure or tongued-and-grooved joint.

12. The engineered wood flooring with a double-frame substrate as claimed in claim 8, wherein the two vertical grain boards are assembled together to form the vertical grain frame by means of binding without saw-tooth, micro teeth tenon riveting structure, bolted structure, finger jointed structure or tongued-and-grooved joint.

13. The engineered wood flooring with a double-frame substrate as claimed in claim 8, wherein the tongued-and-grooved joint is set around all the outer periphery of the engineered wood flooring and the tongued-and-grooved joint can be fixed with the tongued-and-grooved joint of another engineered wood flooring with a double-frame substrate.

14. The engineered wood flooring with a double-frame substrate as claimed in claim 1, wherein a width of each strip-type horizontal grain board is both in a range of 1 to 4 cm.

15. The engineered wood flooring with a double-frame substrate as claimed in claim 1, wherein a thickness of the engineered wood flooring is in a range of 0.5 to 3 cm.

16. The engineered wood flooring with a double-frame substrate as claimed in claim 1, wherein the horizontal grain core and the vertical grain frames are assembled together to form the double-frame substrate of wood by means of binding without saw-tooth, micro teeth tenon riveting structure, bolted structure, finger jointed structure or tongued-and-grooved joint.

17. The engineered wood flooring with a double-frame substrate as claimed in claim 1, wherein the two vertical grain boards are assembled together to form the vertical grain frame by means of binding without saw-tooth, micro teeth tenon riveting structure, bolted structure, finger jointed structure or tongued-and-grooved joint.

18. The engineered wood flooring with a double-frame substrate as claimed in claim 1, wherein the tongued-and-grooved joint is set around all the outer periphery of the engineered wood flooring and the tongued-and-grooved joint can be fixed with the tongued-and-grooved joint of another engineered wood flooring with a double-frame substrate.

19. The engineered wood flooring with a double-frame substrate as claimed in claim 1, wherein the plurality of strip-type horizontal grain boards have a same width, a same length and a same thickness.

* * * * *